Jan. 9, 1951     T. R. SMITH     2,537,798
FREE ECCENTRIC TYPE VALVE WITH EXTERNAL SEAL CAP
Filed Feb. 2, 1946     2 Sheets-Sheet 2
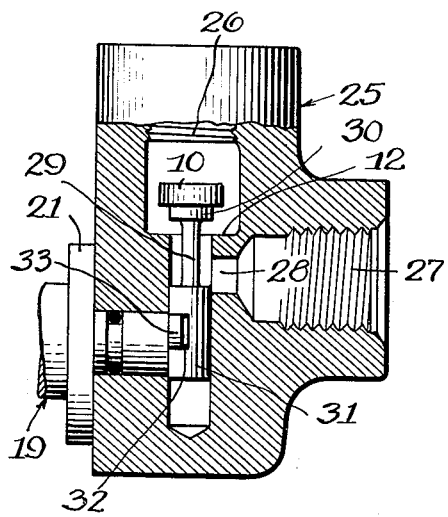
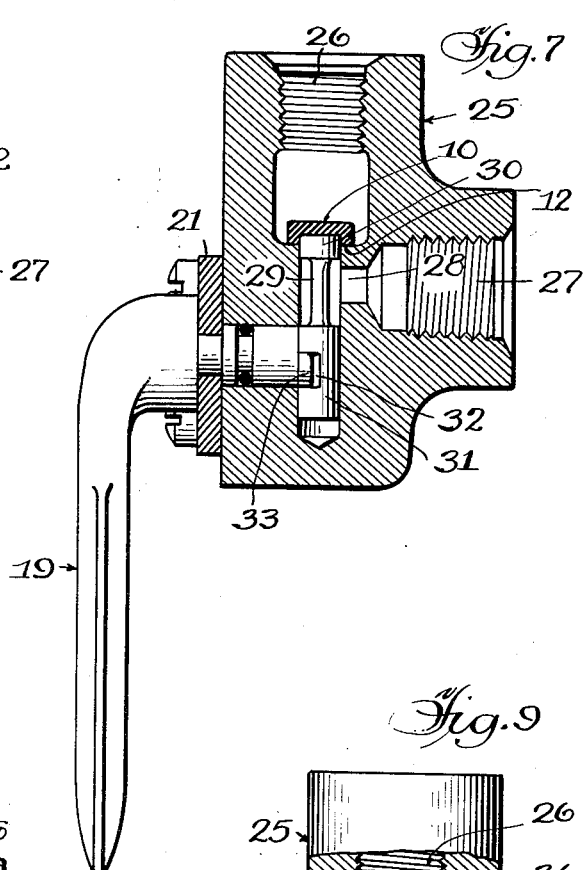
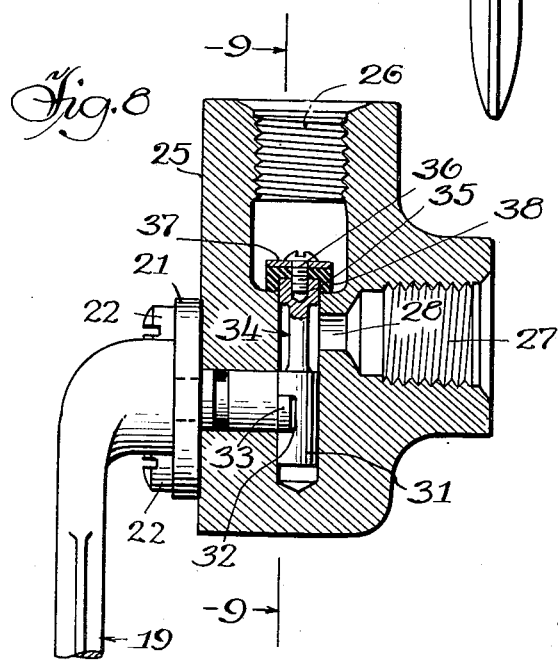
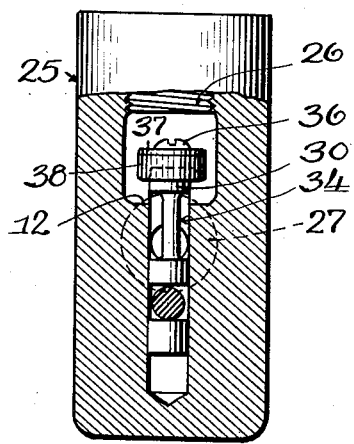
INVENTOR.
Thomas R. Smith
BY
Parkinson & Lane
Attys Patented Jan. 9, 1951

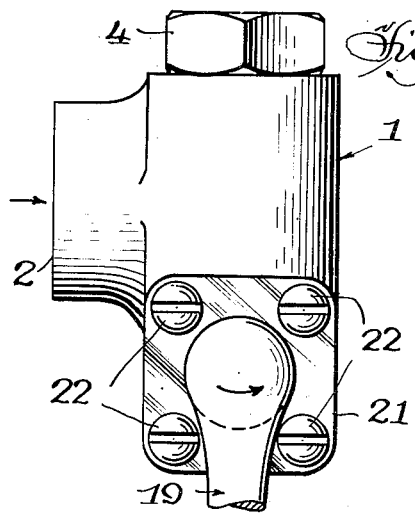
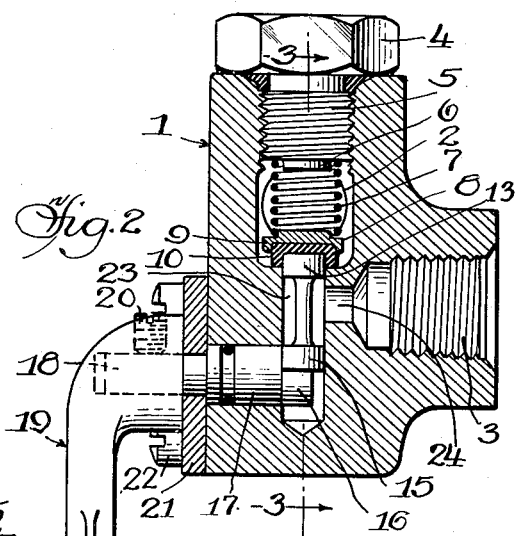
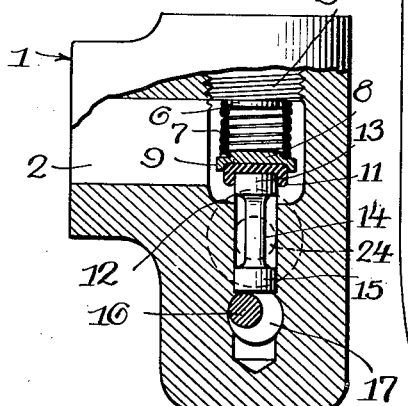
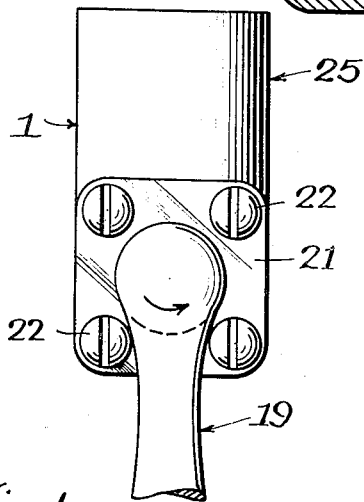
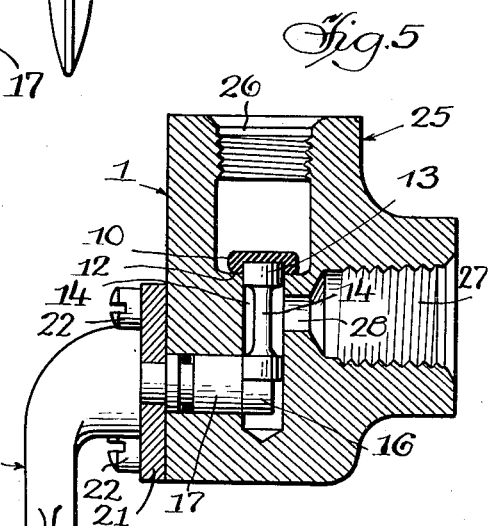

2,537,798

UNITED STATES PATENT OFFICE 2,537,798

FREE ECCENTRIC TYPE VALVE WITH EXTERNAL SEAL CAP

Thomas R. Smith, Newton, Iowa, assignor to The Maytag Company, Newton, Iowa, a corporation of Delaware Application February 2, 1946, Serial No. 645,054

2 Claims. (Cl. 251—132)

1

The present invention relates to a valve construction and especially to a novel valve and valve seat seal provided with an external sealing element disposed upon the upper end of a movable plunger, and which sealing element is self-sealing in operation.

Among the objects of the present invention is the provision of a novel valve sealing construction including a cup-shaped sealing element disposed upon the upper end of a plunger actuated by an eccentric and with the pressure applied from the exterior of the sealing element.

The invention further comprehends a novel valve assembly of the free eccentric type provided with an external sealing element of substantially cup-shape so positioned that the pressure of the incoming fluid is applied from the outside of the sealing element.

Another object of the present invention is the provision of a novel seal assembly including a resilient or flexible sealing element that is self-sealing and positive in operation and which is so constructed and arranged as to prevent extrusion thereof by the pressure of the fluid being sealed.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of one embodiment of the novel valve and valve seat seal.

Fig. 2 is a view in vertical cross-section through the assembly of Fig. 1, but showing the cap and control handle in side elevation.

Fig. 3 is a view in vertical cross-section taken in a plane represented by the line 3—3 of Fig. 2 and with the cap removed.

Fig. 4 is a view in front elevation of an alternate construction of valve assembly.

Fig. 5 is a view in vertical cross-section of the assembly shown in Fig. 4.

Fig. 6 is a fragmentary view, part in vertical

2 cross-section and part in side elevation, of a valve body similar to that shown in Figs. 4 and 5, but provided with a modified form of valve plunger, the valve being shown in open position.

Fig. 7 is a view in vertical cross-section of the assembly shown in Fig. 6, with the valve in closed position.

Fig. 8 is a view in vertical cross-section of the valve assembly showing another form of valve.

Fig. 9 is a view, part in side elevation and part in vertical cross-section, the section being taken in a plane represented by the line 9—9 of Fig. 8, but with the valve open.

Referring more particularly to the disclosure in the drawings, and especially to the novel embodiments therein selected to illustrate the invention, the valve assembly shown in Figs. 1, 2 and 3 comprises a valve body 1 provided with an inlet 2 and an outlet or discharge 3. Mounted in the upper end of the hollow valve body is a cap 4 having a threaded shank 5 and with its lower end reduced at 6. Encompassing this lower reduced end 6 is one end of a coiled spring 7, the lower end of which seats against a spring guide 8 having a depending peripheral flange 9 adapted to receive a cup-shaped resilient or flexible sealing element 10. This sealing element is provided with a depending sealing lip or skirt 11 adapted to seat or engage against the shoulder or seat 12 provided in the valve body when the valve is in closed position.

The sealing element 10 is so cupped as to be slipped over and receive the upper end 13 of a plunger 14 with the lower end 15 of this plunger seating upon an eccentric 16 disposed on the end of a stub shaft 17 having its other end reduced at 18. This reduced end is conformably received in an opening in a control handle 19 and locked thereto by means of a set screw 20. The control handle is rotatably mounted on the exterior of a cover plate 21 secured to the valve body by screws or other attaching means 22. As shown in Figs. 1 and 2, the valve is in closed position and in this position the control handle extends downwardly as therein shown. When this control handle is moved in a counter-clockwise direction through substantially 180°, the eccentric 16 raises the plunger 14 and thereby carries the seal with it to the position shown in Fig. 3.

It will be apparent that the cap seal 10 is held onto the end 13 of the plunger by means of the spring guide 8 and the spring 7. As the control handle 19 is moved toward open position, the eccentric 16 forces the plunger 14 upward against the spring guide 8 and spring 7 and w the plunger carrying the seal with it. This pulls the seal 10 away from its seat 12 while the plunger is still in the valve seat opening 23 leading to the port 24 of the outlet 3. This construction and arrangement of the plunger end 13 prevents any extrusion of the seal or sealing element. In fact, the plunger end 13 does not leave the opening 23 and permit free flow of the fluid being carried until the sealing element has been pulled completely away from the valve seat 12.

In this construction the spring 7 and its guide 8 retain the sealing element in place and also cause the valve assembly to follow the movement of the plunger 13 actuated by the eccentric 16, although the pressure of the fluid being sealed assists in causing the sealing element to follow the movement of the eccentric.

The eccentric 16 is so positioned that when the handle 19 is moved to closed position in which the eccentric is disposed at its lowermost point, there is a small amount of endwise compression on the sealing lip 11 of the sealing element to thereby ensure complete and positive sealing. The pressure of the fluid being sealed being above or exterior of the sealing element forces the downwardly projecting lip of this element into the corner formed by the valve seat 12 and the end 13 of the valve plunger, thereby giving a self-sealing action.

Figs. 4 and 5 disclose an alternate construction in which the valve body 25 is provided with an inlet 26 in the upper end and an outlet 27 or discharge in a side wall thereof. The eccentric, control handle and plunger are similar in construction, operation and arrangement with that shown in Figs. 1, 2 and 3, and similar reference characters have been applied thereto. In this construction and form of the invention, the follow-up spring and spring guide have been eliminated, and the pressure of the fluid in the system is solely relied upon for holding the sealing element 10 in place upon the upper end 13 of the plunger, and to cause the assembly of the sealing element 10 and plunger 14 to follow the eccentric 16 when the control handle 19 is moved to closed position. As in the construction shown in Figs. 1, 2 and 3, movement of the control handle in a counter-clockwise direction from the position shown in Fig. 4 and when moved through an arc of approximately 180°, causes the eccentric 16 to raise the plunger 14 and sealing element 10 sufficient to cause the latter to initially pull away from the valve seat 12, and thereafter raising the end 13 of the plunger such an amount that it leaves the opening 23 and permits the entering fluid to pass through this opening, port 28 and into discharge passage or outlet 27.

Figs. 6 and 7 disclose a valve body 25 similar in construction to that shown in Figs. 4 and 5 provided with an inlet 26 in its upper end and an outlet or discharge passage 27 in a side wall thereof. The remainder of the structure is also similar to that shown in Figs. 4 and 5 except for the valve plunger 29. In this construction the valve plunger has mounted on its upper end 30 a sealing element 10, but the lower end 31 of the plunger is enlarged in length or depth and provided intermediate its length with a slot 32 for conformably receiving the eccentric 33. By mounting or seating the eccentric within the slot in the plunger, the movement of the plunger is positive in both directions of its travel. As in Figs. 4 and 5, the sealing element 10 is retained in place solely by the pressure of the fluid being sealed.

In Figs. 8 and 9, the structure including plunger 34 is similar in construction and arrangement with that shown in Figs. 6 and 7 except that the upper end 35 thereof is threaded or capped to receive a screw or other attaching means 36, which in combination with a washer 37 retains a cup-shaped sealing element 38 upon the upper end of the plunger. There is thus provided in this form of the invention a complete and positive action on both the movement of the plunger and the seal in that the pressure of the fluid is not relied upon for retaining the sealing element upon the upper end of the plunger but such sealing element is positively locked thereto.

From the above description and the disclosure in the drawings, it will be readily apparent that the invention comprehends a novel eccentric type of valve provided with an external cup seal or sealing element of flexible or resilient rubber or rubber-like material, such as natural or compounded synthetic rubber. In all of the forms disclosed, the cup-shaped sealing element is provided with a depending sealing lip or skirt, and when in sealing position has a small amount of endwise compression permitting the lower end of the skirt or sealing lip to press against the valve seat, thereby assuring effective sealing regardless of the pressures involved. This results in a self-sealing action with the pressure of the fluid forcing this skirt or lip into the corner formed by the plunger and valve seat.

Having thus disclosed my invention, I claim:

1. In a fluid valve construction, a valve body having an inlet, a passage and a valve seat encompassing the passage, a valve plunger slidably mounted in the passage and provided at the inlet end of the passage with a head a portion of which enters and fits conformably in the passage to substantially restrict the flow therethrough when the plunger is moved toward closed position and when in said closed position the remaining portion of the head extends beyond the valve seat, an inverted cup-shaped resilient sealing element having a depending flange and sealing lip embracing the extended portion of the head and with the sealing lip spaced from the entering portion of the head and adapted to contact and seat against the valve seat about the passage to thereby completely close and seal off any further flow therethrough, said position of the sealing lip on the head being such as to prevent extrusion of the sealing lip by the entering fluid during opening and closing of the passage, and a cam engaging the plunger for moving the plunger and sealing element to open position and for limiting the axial compression on the sealing lip when the plunger is moved to closed position.

2. In a fluid valve construction, a valve body having an inlet, a passage and a valve seat encompassing the passage, a valve plunger slidably mounted in the passage and provided at the inlet end of the passage with a head a portion of which enters and fits comformably in the passage to substantially restrict the flow therethrough when the plunger is moved toward closed position and when in said closed position the remaining portion of the head extends beyond the valve seat, a resilient sealing element carried upon the extending portion of the head of the plunger and provided with an integral annular preformed depending sealing lip closely encompassing the extending portion of the head, and the lower end of said sealing lip being adapted to contact and seal against the valve seat after the restricting portion of the head enters the passage to completely close and seal off any further flow therethrough, and a cam disposed adjacent the opposite end of said plunger movable to one position to open said passage and to a second position to close said passage, and said cam providing a positive stop to limit axial compression of the depending sealing lip.

THOMAS R. SMITH.

REFERENCES CITED

The following references are of record in the file of this patent:

UNITED STATES PATENTS

| Number | Name | Date |
|---|---|---|
| 131,216 | Hallenbeck | Sept. 10, 1872 |
| 818,054 | Sears | Apr. 17, 1906 |
| 1,071,753 | Kellan | Sept. 2, 1913 |
| 1,290,583 | Kruecke | Jan. 7, 1919 |
| 1,785,259 | Hickerson | Dec. 16, 1930 |
| 2,002,672 | Melott | May 28, 1935 |
| 2,397,269 | Kelly | Mar. 26, 1946 |

FOREIGN PATENTS

| Number | Country | Date |
|---|---|---|
| 309 | Great Britain | 1914 |